United States Patent [19]
Wechsler

[11] 3,769,889

[45] Nov. 6, 1973

[54] THREE DIMENSIONAL IMAGE REPRODUCTION WITH PSEUDO-SCOPY CORRECTION BY IMAGE INVERSION OPTICS WHICH ARE CAPABLE OF INDEPENDENTLY CONTROLLING Z-AXIS PLACEMENT IN IMAGE SPACE

[76] Inventor: Robert M. Wechsler, 475 FDR Dr., New York, N.Y.

[22] Filed: Feb. 9, 1972

[21] Appl. No.: 224,793

[52] U.S. Cl. .......................... 95/18 P, 353/6, 353/7, 355/22
[51] Int. Cl. ............................................ G03b 35/08
[58] Field of Search ........................ 95/18 P, 12.5; 355/22; 352/86; 353/6, 7; 350/133, 139

[56] References Cited
UNITED STATES PATENTS
| | | |
|---|---|---|
| 3,291,555 | 12/1966 | Browning ...................... 95/18 P X |
| 2,434,385 | 1/1948 | Bonnet .......................... 95/18 P X |
| 2,492,836 | 12/1949 | Bonnet .......................... 95/18 P |

FOREIGN PATENTS OR APPLICATIONS
| | | |
|---|---|---|
| 173,571 | 1/1922 | Great Britain ..................... 95/18 P |

Primary Examiner—Richard L. Moses
Attorney—Laurence R. Hefter et al.

[57] ABSTRACT

A method of producing multiple perspective, auto-stereoscopic images is disclosed along with a camera employing the method, which lends itself to inexpensive construction and which may be hand-held to take pictures with excellent depth illusion and virtually free of Z-axis compression with exposure times appropriate to conventional photography. The camera employs a selector screen and is constructed such that any point in object space viewed by the camera may be imaged anywhere along the depth axis of the picture, in image space, so that the image may be made of any extent desired, a virtual image, independently of camera focus by controlling the orientation relative to the camera axis of the optical image-reversal elements employed for pseudoscopy correction or by providing additional optical elements associated with each such image reversal element for optically effectively controlling such orientation.

27 Claims, 13 Drawing Figures

THREE DIMENSIONAL IMAGE REPRODUCTION WITH PSEUDO-SCOPY CORRECTION BY IMAGE INVERSION OPTICS WHICH ARE CAPABLE OF INDEPENDENTLY CONTROLLING Z-AXIS PLACEMENT IN IMAGE SPACE

BACKGROUND OF THE INVENTION

Three dimensional parallax photography dates roughly from nineteen hundred, when Frederick Ives invented the parallax stereogram, viewable without the aid of an external viewing device to correlate separate perspectives with the left and right eyes. Ives' device is shown in United States Pat. No. 725,567, FIGS. 3, 4, and 5 of which are reproduced herein as FIGS. 1a, 1b, and 1c showing both large lens (FIGS. 1a and 1b) and small lens (FIG. 1c) optics focusing perspectives through a line grating or screen having alternating vertically extending opaque and transparent strips, onto a sheet of film.

Ives recognized that the apertured lens areas in the large lens cause some convergence of the respective perspectives toward the lens axis, and taught that the prisms in the small lens embodiment should be angled to exactly duplicate this convergence, which results in the object focused upon being placed in the image plane (i.e., that plane in image space just rearward of the selector screen which the edge or frame of the picture appears to occupy and which does not appear to be displaced into or out of the picture) on the Z-axis. As used herein, an image means a three dimensional image formed of multiple perspectives, a perspective being a two dimensional reproduction taken from a single point of view.

Figure 1A:
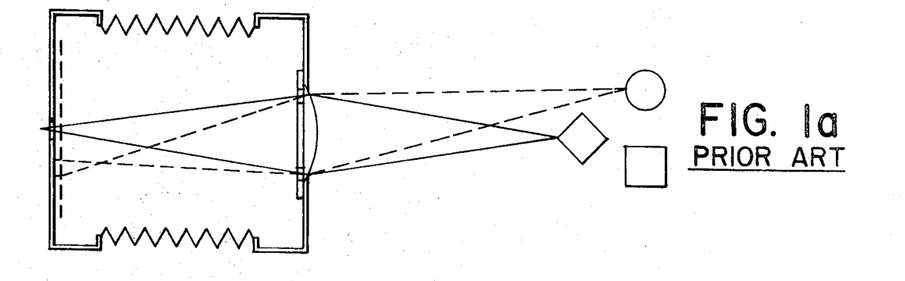
FIGS. 1a, 1b, and 1c illustrate a prior art device.
Figure 1B:
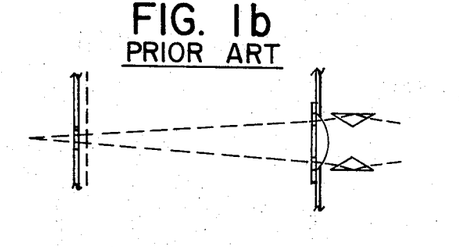
Figure 1C:
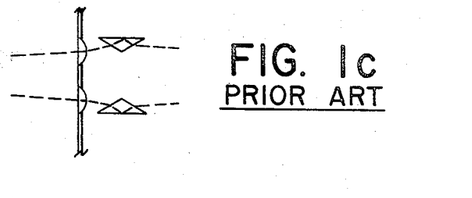

Ives also recognized that with the embodiment shown in FIG. 1a the resultant image would be pseudoscopic, that is, the location of objects on the Z-axis, or depth axis (normal to the image plane) would be reversed. To obtain an orthoscopic, as opposed to a pseudoscopic image, Ives provided laterally inverting prisms in front of the lens (or lenses). This results in an undersirable image reversal such that the picture appears to be a mirror image of object space. To correct this, Ives suggested using fully inverting prisms instead of just laterally inverting prisms or, alternatively, taking the picture as reflected in a mirror.

The problem of rendering an orthoscopic image has largely occupied subsequent contributors in this field. Several methods of obtaining orthoscopy have evolved, one employing relative motion between one or more of the object, lens, line screen and film. Another employs, in a static type camera, optical image-reversal devices such as Ives' prisms. In the static type cameras, three or more lenses may be employed in order to provide a panoramic rather than simply a stereoscopic view (i.e., panoramic meaning to display more than two perspectives), image continuity (that is, the continuity of transition of perspective as the viewer moves laterally with respect the selector screen) generally improving as the number of lenses employed increases within the acceptance angle of the selector screen, i.e., the angle of view of a single lenticule in a lenticular screen or of a single slit in a line screen. In non-static cameras, the motion of the lens simulates an infinite number of lenses. The additional mechanism required for the lens scan and the tendency of the lens motion to blur the image obtained, however, make the static camera preferable for most applications.

One such static camera for taking parallax panoramograms was disclosed in French Pat. No. 618,880, issued Dec. 21, 1926 to Bessiere. The Bessiere device is a fixed focus camera having a liner, arcuate array of lenses, concave toward the film, with a pseudoscopy correction prism in front of each lens. Objects at infinity are imaged in the plane of the selector screen in the Bessiere device, which is just in front of the image plane, so that all other non-infinitely distant objects in the photograph appear to be imaged also in front of the film plane, which is coincident with the image plane; that is, they are imaged in "real image space." Since all of Bessiere's image is located in real image space it is called a totally real image.

As used herein, a "totally real" image is one wholly in front of the image plane, while a "totally virtual" image is one located behind the image plane in "virtual image space." In a totally real image or in the real image space component of any image, the depth illusion is usually severely limited. The phenomenon of marginal cut-off, whereby foreground objects near the margins of the picture appear to recede into the background, largely destroys the illusion of depth in many real-image pictures. Hence it is highly desirable to obtain a virtual image rather than a real image, or at least an image a significant component of which is located in virtual image space.

Pictures obtained with the Bessiere camera would exhibit a Z-axis distance relationship much smaller than the actual distances involved in object space, i.e., severe depth compression. The depth compression of a picture taken with Bessiere's camera is so great as to compress an infinite distance into the lens-to-selector screen distance used to take the picture.

Certain mirror or reflective prism arrangements have been proposed for adjusting the placement of the image along the Z-axis in image space in a stereoscopic camera (see e.g. United States Pats. Nos. 3,013,468, 2,413,996, 2,516,718, 1,851,705, and 2,736,250 and French Pat. No. 921,421), all of which require, however, relatively large and unwieldy mirror structures mounted on the front of the camera and most of which require additional structure for correcting the pseudoscopic image formed to an orthoscopic image. Moreover, no way appears to be shown in these patents enabling extension of the mirror or reflective prism arrangements to cameras with three or more lenses and any such extension, if possible, would seem to be too cumbersome and complex to be practically workable. In certain static autostereoscopic cameras, e.g., that shown in United States Pat. No. 2,573,242 to Bonnet, Z-axis placement in image space is automatically determined by the focus of the camera. Since the camera must be focused to obtain an acceptable image, no means of Z-axis control independent of focus is possible.

SUMMARY OF THE INVENTION

In accordance with the present invention, the optical image inverters employed in an autostereoscopic panoramic camera for pseudoscopy correction are permanently or adjustably disposed so as to provide the desired location of the photographed object along the image space Z-axis. Particularly, the angles formed between the image inverters and the lens axis of the camera (i.e., the normal to the film plane) are selected to converge the light rays from the several lenses or lens areas so as to achieve the desired Z-axis location of the image, independently of camera focus. By this means, any desired portion of the resultant image may be made virtual, or behind the image plane, wholly irrespective of the distance for which the camera is focused. No cumbersome mirror or reflective prism arrangements are required, the same optical elements serving to provide Z-axis control as are employed to correct pseudoscopy.

The system of the invention is applicable both to fixed focus and variable focus cameras, and may in either case be constructed so that an object at a fixed, predetermined distance from the lens in object space is imaged at Z=0 in image space (the image plane) or to permit continuous or discrete variation of the image along the Z-axis independently of focus. If desired, the Z-axis placement control may be linked mechanically to the focus control, providing any desired mechanically achievable relationship between Z-axis placement and focus.

In a further embodiment of the invention, the plurality of small lenses or single large lens is replaced by a single lens which is mechanically swept across the film. The angle between its attendant correction prism and the Z-axis is continuously varied during the sweep in a predetermined manner to control the location on the Z-axis in image space of an object at a given distance from the camera.

Advantageously, a spring back may be employed to register the film against the line or lenticular screen, which is flat on the side adjacent the film. Contrary to prior teachings that a complex and expensive vacuum back is required for this purpose, or alternatively that glass plates must be used in order to achieve acceptable planar contact between film and selector screen, it has been found that the spring back disclosed herein provides images of superior quality.

The term "camera" as used herein is intended to encompass and include not only a conventional camera but any optical device for forming a three-dimensional image in an image plane, for electronic storage or reproduction or for any other purpose.

BRIEF DESCRIPTION OF THE DRAWINGS

The invention will further be described with respect to the following drawings illustrating specific embodiments thereof, in which.

DESCRIPTION OF PREFERRED EMBODIMENTS OF THE INVENTION

Figure 2:
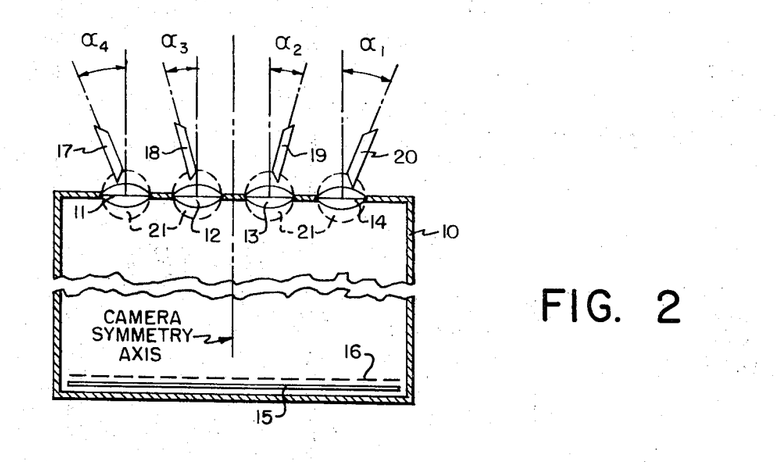
FIG. 2 is a schematic representation of a camera constructed in accordance with the invention employing plural small lenses.

FIG. 2 shows an embodiment of the invention in which a camera 10 is provided with four lenses 11, 12, 13, and 14 for forming an image on a photosensitive surface disposed in the image plane. A line screen 16 is disposed parallel to and in front of the image plane at a predetermined distance for forming the perspectives projected by the lens into a plurality of discrete fields, as is well known in this art, in order to obtain a three dimensional image under appropriate viewing conditions. Instead of a line screen, composed of alternating opaque and transparent segments, a lenticular screen or other selector may be employed.

Lenses 11–14 need not be disposed at equal distances from the image plane. For example, they may be disposed in an arc, although a straight-line array is greatly preferred as it permits all of the lens axes to be parallel to the normal to the film plane (camera axis) and the lenses to be equidistant from the film plane, providing better focus, clarity of image and depth of field.

The lenses 11–14 receive light through respective inverting prisms 17, 18, 19 and 20, which may for example be Dove prisms and which are mounted on wheels or gears 21 so that the long axis of each prism extends essentially radially from the center of its respective lens and is rotatable about the lens center, as will be described more fully in connection with FIG. 6. Each prism is disposed as close as is conveniently feasible to the center of the lens. The base, or long side of each prism, forms an angle $\alpha$ with the camera axis, each angle $\alpha$ being selected such that any chosen point in object space is imaged by all of the lenses at the same point on the image plane. The angles $\alpha$ are mirror symmetrical with respect to the symmetry axis of the lens array, shown in FIG. 2.

Figure 3:
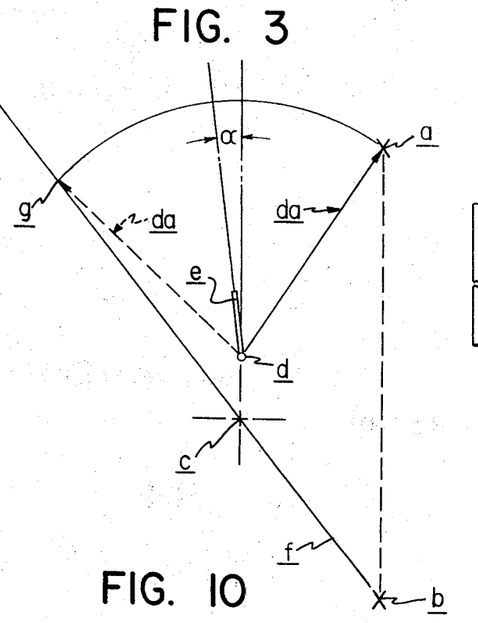
FIG. 3 is a sketch illustrating the derivation of prism angles for various conditions of object distance, film distance and other parameters of the camera.

The angles $\alpha$ may be determined as illustrated in FIG. 3. Each prism acts in effect as a plane reflector, and may be replaced for purposes of analysis by a mirror along the prism axis parallel to its base.

Assume that an object point $a$ is to be imaged at an image point $b$ through a lens having its center at $c$, immediately above which a pivot point $d$ is shown about which a prism represented by mirror surface $e$ is disposed. A line $f$ is drawn from image point $b$ through the lens center $c$. A radius $da$ from the prism pivot $d$ to the object point is struck off from point $d$ to intersect line $f$ at point $g$. The bisector of angle $gda$ may be constructed, giving the correct angle $\alpha$ for a prism in conjunction with a lens at $c$ in order to image an object at a point $a$ at point $b$ in the image plane. Similarly, the prism angles for all lenses may be constructed for given lens-to-image plane and lens-to-object distances, for giving the angles $\alpha$ for any camera under all conditions. For the camera illustrated in FIG. 2, the prism pivot point $d$ coincides with the lens center $c$. For any construction such as that illustrated in FIG. 3, by placing the image plane such that it contains point $b$, it will be apparent that all objects farther from the camera than point *a* will be imaged in virtual image space in the resulting picture and all objects closer than point *a* will be imaged in real image space.

To illustrate the last described method for constructing a camera in accordance with the invention, a specific embodiment was designed in accordance with the diagram of FIG. 2 employing the method illustrating with respect to FIG. 3. Nine lenses were employed, each having a focal length $f=273$ millimeters and a diameter of one-half inch covered by a one-fourth inch by one-fourth inch square aperture. The lenses are aligned contiguously in a horizontal row 15 ⅞ inches in front of the image plane, and a lenticular screen is disposed with its rear flat surface contiguous with the image plane. Each prism is pivoted on a point approximately one-eighth inch directly in front of its associated lens, the angles $\alpha$ formed by the outer lenses being 2° to within about 30' of arc and the inner angles being defined by the formula $\alpha=\chi$, where $=1°$ per inch since the outer lens centers are spaced 4 inches apart. For the specific embodiment described, all objects at a distance from the camera greater than about 3 feet 2 ½ inches are imaged in virtual image space. If in the last described embodiment all prisms are set at $\alpha=0$, facilitating construction and minimizing construction cost, then all objects at distances greater than about 17 ½ inches from the camera will be imaged in virtual image space.

Figure 4:
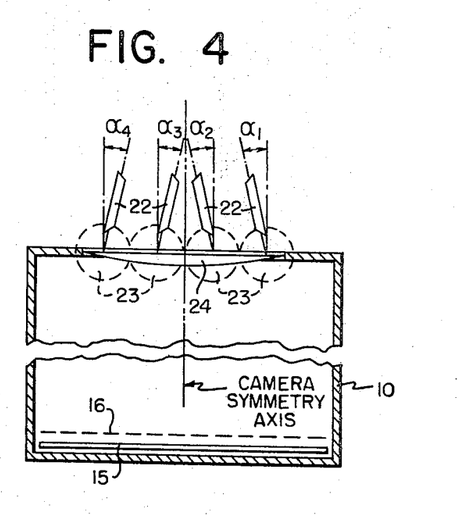
FIG. 4 is a schematic representation of a camera similar to that of FIG. 2 but which employs a single large lens.

FIG. 4 schematically shows a plurality of prisms 22 rotatably mounted on pivots 23 disposed substantially at the front surface of a single large lens 24.

Figure 10:
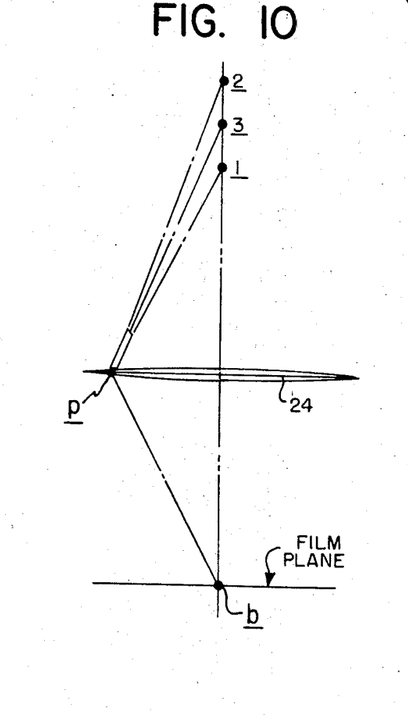
FIG. 10 is a schematic diagram illustrating the determination for prism angles for large lens cameras.

Each angle $\alpha$ in FIG. 4 formed between prisms 22 and the camera axis may be calculated in accordance with the diagram of FIG. 10, in which lens 24 (assumed to be a thin lens) has been spaced from the film plane containing point *b* by a distance such that point 1 is in focus. The optical action of the apertured lens area at the pivot of the prism thus images point 1 at *b* by utilizing an appropriately angled prism. An arbitrarily chosen point 2 may be imaged at *b* by aligning the prism along the bisector of the angle formed by the lines drawn from points 1 and 2 to the pivot point *p* of the prism, this being the correct angle, for the focus setting, to place an object at point 2 in the image plane in image space. The angle of each prism may be determined in this manner. Embodiments of the invention employing large lenses are considerably more expensive to construct than those with plural small lenses due to the high cost of producing a lens having a diameter greater than an interocular distance (about 2½ inches). Also, large lenses tend inherently not to provide the same depth of field as small ones, and this as well as other optical effects preclude obtaining the same depth effect and image quality with large lenses as with small ones.

Figure 5:
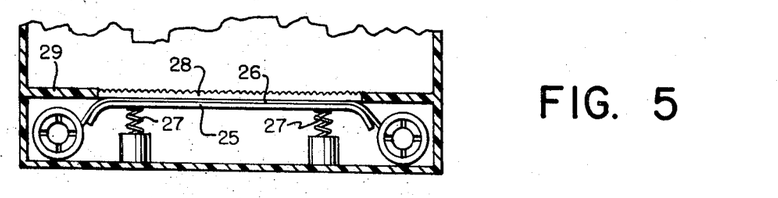
FIG. 5 is a cross-sectional schematic representation showing a spring back for engaging the film with the line screen.

It has heretofore been believed that extremely accurate planar contact between the selector screen 16 and the film lying in the film plane 15 (in FIG. 2) is required for obtaining images of acceptable quality. It has been found, however, contrary to prior teachings, that a spring back 25 as shown in FIG. 5 may be employed, which may be (but need not be) disengaged from the film 26 while the film is transported between exposures. Alternatively, the selector screen may be disengaged to a forward position, the spring back 25 coming to rest short of this forward position against stops provided in the camera body. Spring back 25 is preferably surfaced with felt or a similar yieldable material to insure uniform contact between film and screen. Spring back 25 may be made of sheet metal standard in the construction of camera bodies and may be pressed against film 26 by coil springs 27 or any other equivalent source of pressure. Lenticular screen 28 is made rigid enough so that it does not structurally distort under pressure from spring back 25. It is mounted in support 29 and its rear surface, adjacent the film, is made flat so as not to score the film during film transport and to maintain the film in a plane in conjunction with the spring back.

Figure 6:
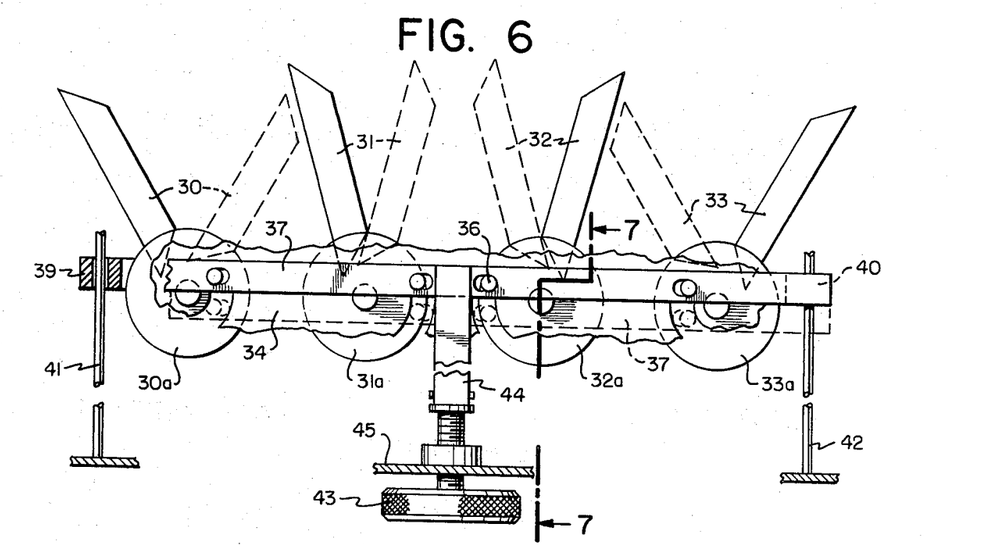
FIG. 6 is a side view illustrating a mechanism for adjustably controlling the angles $\alpha$ of the inversion prisms relative to the camera axis.
Figure 7:
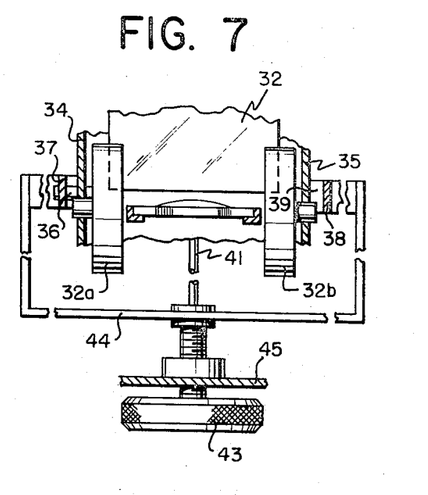
FIG. 7 is an end sectional view taken along line 7—7 in FIG. 6.

FIGS. 6 and 7 illustrate a mechanism for continuously varying the angles $\alpha$ of a row of inverting prisms with respect to the lens axis. Four prisms 30, 31, 32 and 33 are shown, each carried by a pair of respective rotatable mounts 30a and 30b, 31a and 31b, etc., rotatably carried by side frames 34 and 35 on either side of the lenses. Each mount carries a stud (e.g., stud 36) which is cammed by a respective cam member 37 or 38 so as to controllably rotate the mounts, thus varying in a predetermined desired manner the angles $\alpha$ of each prism. The desired manner of varying the angles $\alpha$ may be obtained by positioning each of the respective studs (e.g., stud 36) radially with respect to its rotatable mount, the larger the radius from the center of the mount to the stud, the smaller the angle $\alpha$ through which the associated prism is varied. Cam members 37 and 38 are joined by cross bars 39 and 40 at their ends slideably supported on rods 41 and 42 extending from the camera body to permit movement toward and away from the camera body. Such movement is controlled by knob 43, through U-frame 44 extending around the camera body to the prism control system in front of the camera. Rotation of control knob 43, mounted in a plate 45 (attached to or forming part of the camera back) moves cam members 37 and 38 between the positions shown schematically in solid and dashed lines respectively in FIG. 6, thereby acting upon studs 36 etc., to rotate the prism mounts to the desired respective angles $\alpha$ for each prism in accordance with the particular radius at which the stud corresponding to each prism is set. Only the front (or rear) row of rotatable mounts, such as mounts 30a, 31a, 32a, 33a, need carry studs for co-acting with a cam member. Other mechanisms equivalent in function to the cam and rotatable mounts may be employed to controllably vary the angles $\alpha$ in the desired manner.

In a camera with an adjustable Z-axis control such as is described above with respect to FIGS. 6 and 7 it is not necessary to know in advance the particular angles $\alpha$ at which object spaced particular distances from the lens will be imaged in the image plane. This can be determined by replacing the film and selector screen in the image plane with a piece of ground glass. Several overlapping perspectives will appear on the ground glass, and the desired Z-axis placement may be achieved by choosing the point in object space to be imaged on the image plane, and varying the prism angles $\alpha$ to bring into coincidence the images of this point in the several perspectives, similar to a coincident image optical rangefinder.

Alternatively the depth placement of the image may be directly viewed (and adjusted) through a second selector screen laced back-to-back with that already in the camera and interposing a diffusing layer between the two screens. The latter arrangement is particularly effective in single lens reflex and view cameras, wherein the normal ground glass viewing screen may be replaced by the described double selector screen.

Figure 8:
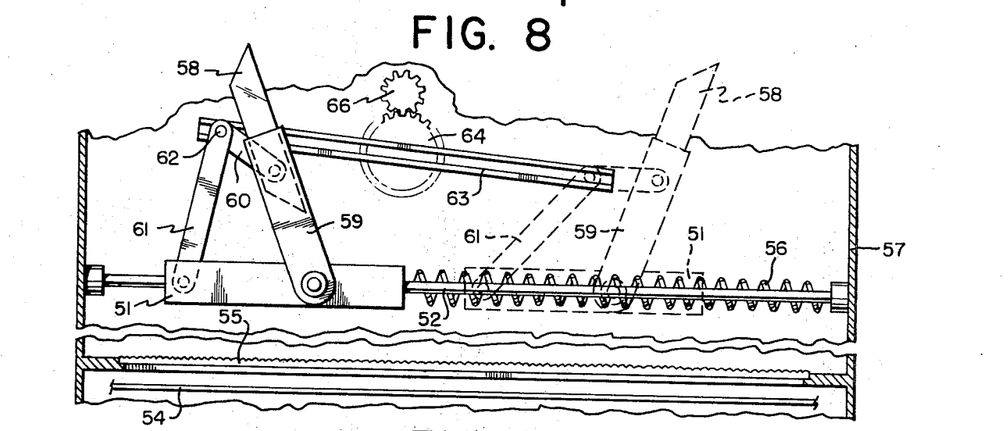
FIG. 8 is a side view illustrating an embodiment of the invention employing a single lens which is scanned across the film plane during an exposure.
Figure 9:
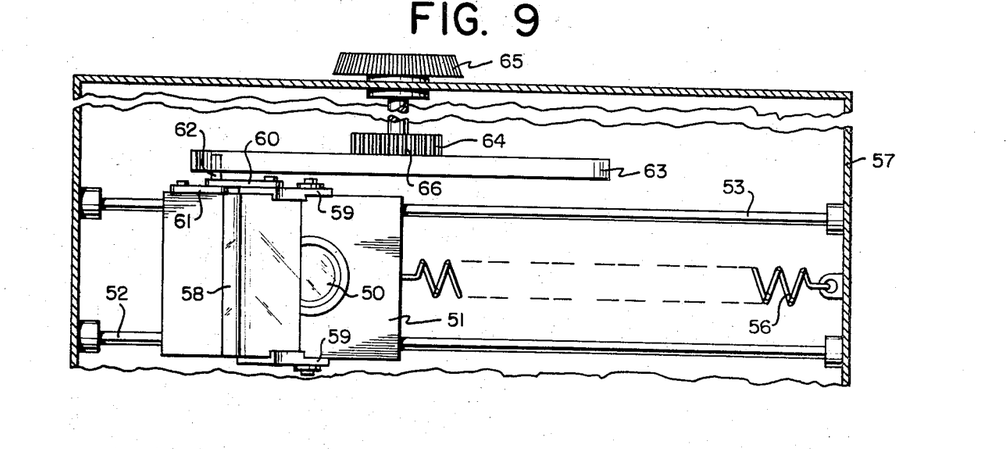
FIG. 9 is a top view of the embodiment of FIG. 8.

FIGS. 8 and 9 illustrate an embodiment of the invention wherein a single lens is continuously swept across the film during an exposure, aproximating an infinite number of discrete lenses disposed in a horizontal row along the moving lens' path of travel. Such an embodiment has the advantage that a large number of effective perspectives is obtained, avoiding a certain flipping effect which occurs when viewing an image formed by several discrete lenses. Nevertheless, additional mechanism is required to drive the lens, as well as (in certain cases) an additional mechanical system for controlling the prism angle as a function of lens position, and the continuous motion of the lens tends somewhat to blur the final image.

A lens 50 disposed in a mount 51 is slidably carried by rails 52 and 53 disposed above film plane 54 in which a photographic film may be placed. A line screen 55 or other selector screen as described above is placed immediately above image plane 54. A spring 56 attached at one end to the supporting structure 57 carrying rails 52 and 53 and at its other end to mount 51 is provided to drive the mount and the lens which it contains across the image plane at a speed determined by the parameters of the spring and of the rail and lens structure. The speed of travel of lens 50 should be chosen slow enough so that the film is adequately exposed under the available lighting conditions and rapidly enough to stop any motion in the scene being photographed, the same considerations which govern the taking of conventional photographs. The spring mechanism and structural parameters should afford sufficient lens travel to span at least an inter-ocular distance, and is preferably chosen so that the lens traverses the acceptance angle of the lenticular screen at the given lens-screen distance. The spring mechanism should further be constructed in accordance with good engineering practice to maintain the lens speed essentially constant during the scan; e.g., the spring should be somewhat compressed even in its extended position. Any other electrical or mehcanical drive mechanism, for example an electrical motor driving the lens mount through a worm or rack and pinion gear, may be provided for controlling the scan.

A prism 58 in a prism mount 59 is provided such that the prism angle $\alpha$ can be continuously varied. Between mount 59 and lens mount or carriage 51 extend a pair of lever arms 60 and 61 pivotably joined together with a pin 62 extending away from the lens and slideably engaged in a cam track 63 carried by a gear wheel 64 mounted on the frame 57 of the scan mechanism.

It will thus be seen that for a given position of cam track 63, as the spring drives the lens carriage 51 from its left-most position (solid line) to its right-most position (dashed line) the prism angle $\alpha$ will vary in the desired manner, which may be readily calculated by the method illustrated in FIG. 3, under control of pin 62 and lever arms 60 and 61.

By rotating knob 65, through the action of gears 66 and 64 the angle of cam track 63 may be varied to control $\alpha$ as a function of carriage position so as to permit continuous variation of the distance of an object that will be imaged in the film plane. In other words, knob 65 permits continuous control of Z-axis placement of the image.

It has been found that pictures of superior quality may be obtained with a scanning camera having, for illustrative purposes, a scan of 5 inches and employing a 30 mm diameter, 273 mm focal length lens apertured with a vertical one-sixteenth inch slit for about a one-quarter second scan under illumination provided by two 375 watt photoflood lamps. The prism angle was maintained at 0° during the scan.

Figure 11:
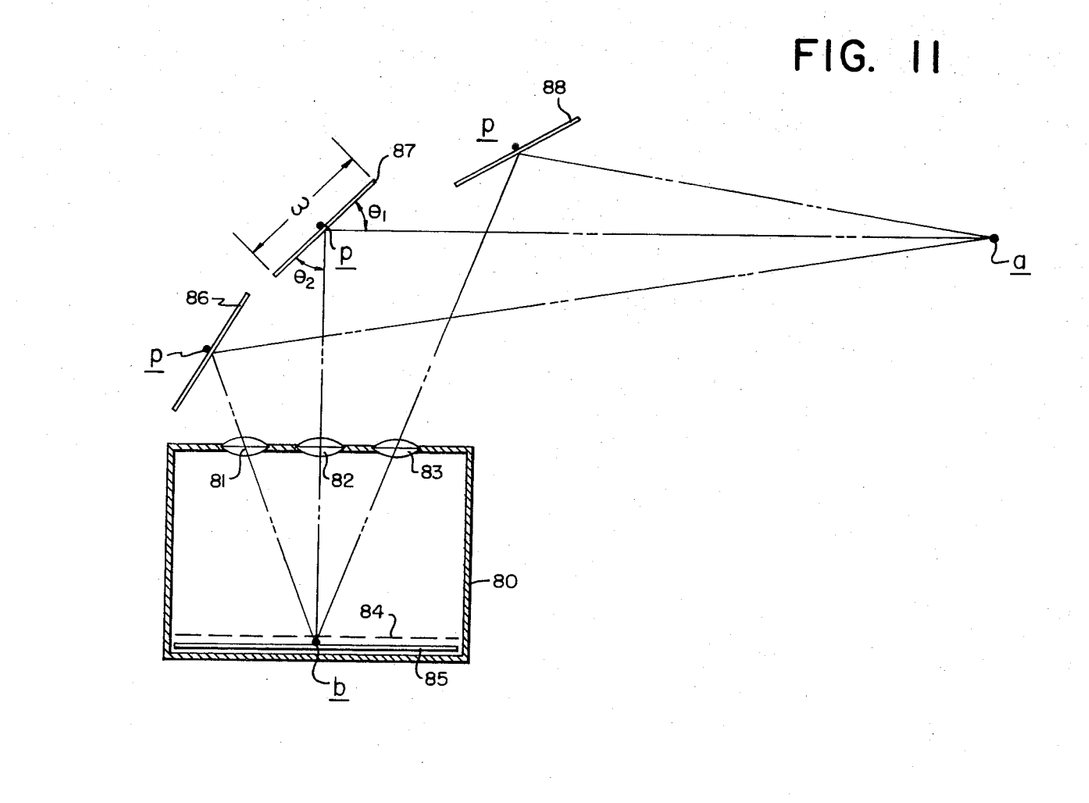
FIG. 11 shows an embodiment of the invention employing mirrors as optical inverters rather than prisms.

FIG. 11 illustrates an embodiment of the invention wherein the optical image inverters are mirrors, the angles of which may be fixed or adjustably controlled to independently achieve the desired Z-axis placement of objects in image space. A camera 80 is shown with three lenses 81, 82 and 83 spanning at least an inter-ocular distance and also spanning an angle equal to the acceptance angle of selector screen 84, disposed in front of film plane 85. In front of each lens is a respective plane mirror 86, 87 and 88 each disposed to reflect a perspective from a point $a$ at right angles to the lenses direction of view onto a respective lens. By also inverting the perspectives, the mirrors cause an orthoscopic rather than a pseudoscopic image to result. The angles of each mirror may be determined as follows. An object $a$ to be imaged (in the field of view of the camera, which is at right angles to the lenses' field of view) in the film plane is selected and a ray diagram is constructed as shown in FIG. 11. The angle of each mirror is then chosen such that the angles of the rays incident to and reflected from it are equal, e.g. for mirror 87, $\theta_1=\theta_2$.

For the particular mirror angles chosen in the case of fixed mirrors, or for all desired angles in the case of pivotably adjustable mirrors, the placement and width $w$ of the mirrors must also be chosen such that the mirrors do not obstruct each other's fields of view and so that each mirror reflects its perspective through only a single lens. Additionally, each mirror should subtend the entire field of view of its associated lens. By pivoting the mirrors about respective points $p$, the distance from the camera of an object at $a$ to be imaged in the image plane may be varied, and the mirrors may be adjustably mounted in order to permit controlling Z-axis placement as desired.

In any embodiment of the invention described herein, the desired angles of convergence of the light from each lens may be obtained by effectively, rather than actually, angling the prisms. This may be accomplished by providing optical tilters in the light paths of each prism, or by grinding the entrance or exit faces of the prisms to refractively provide the desired convergence.

An optical tilter may simply be, for example, a piece of thick (e.g. one-half inch) glass in the optical path of the prism which may be angled in accordance with well known optical principles by an amount necessary to provide the desired convergence of the light rays entering it such that they intersect the film plane at the point determined in accordance with FIG. 3. Alternatively, such optical tilter may be a prism such as an 80°, 80°, 20° prism, the angles of its construction and its angular position being chosen according to Snell's Law in order to provide the desired convergence of light rays. Electro-optical tilters may similarly be employed in which actual angling thereof is replaced by an electrically induced change in the refractive index or other property of the material employed, as is well known with respect to such devices.

Instead of separate tilting elements, each prism may be ground to achieve the desired convergence angle determined in accordance with FIG. 3. For example in a three-lens camera employing Dove prisms in front of each lens, the prisms may be mounted with their bases parallel, the center prism being a conventional Dove prism and the outer prisms having their exit faces angled in accordance with Snell's law to achieve the desired convergence. For example, the outer two prisms may be oppositely faced, their exit faces ground normal to the exiting light rays and the lens-to-film distance and lens spacing being such as to converge the light from a desired point in object space on the film plane. In a further embodiment of the invention, the exit face of each Dove prism may be ground in the form of a convex lens, rather than being planar, eliminating entirely the need for a separate lens.

In another embodiment of the invention, the large lens of FIG. 4 may be replaced, by a lens composed of lens segments, similar to a Fresnel lens, each segment performing the function both of imaging and convergence. Each lens segment should be about as wide as the exit face of its prism, the segments being aligned parallel to the selector screen and having the same focal length. Whereas Fresnel lens segments collectively converge on and individually focus on the same plane in object space, lens segment curvatures are herein chosen to collectively converge on any chosen plane in object space, regardless of what plane each of the segments is focused on. Thus by appropriately choosing the curvature for each lens-segment at its given location and respective prism angle, at the selected lens-to-film distance any chosen object point may be imaged in the image plane regardless of perspective focus. The segments determined in this manner may be cemented or otherwise mounted together to form the finished lens.

In the varous embodiments described above, the angles $\alpha$ are preferably symmetrical about the camera symmetry axis. If they are not symmetrical about the symmetry axis the camera will merely effectively see in a direction off toward one side rather than straight ahead (or in the case of FIG. 11, at right angles to the camera axis), a practical but less convenient embodiment of the invention.

The prisms used in cameras constructed in accordance with the invention may be any prisms capable of lateral, or left-right, inversion such as Dove prisms.

Total inversion prisms, or prisms capable of both left-right and up-down inversion, may also be employed in order to obtain an image free of lateral reversal. Such prisms may for example be formed of a pair of Dove prisms in series rotated 90° with respect to each other about their long axes. Lateral reversal may alternatively be avoided by making a print from the negative with the negative reversed -- that is, emulsion side rather than shiny side up in the enlarger. The area of the exit faces of the several prisms should preferably cover the entire light collecting surface of the lens or lenses of the camera. If this is not the case, the lens portions not covered should be masked with any convenient opaque material. The teachings of this disclosure with respect to one dimensional lens arrays may be employed in conjunction with two dimensional lens arrays, the selector screen in such cases being a lenslet or fly's-eye lens array, and the prism angles being selected in accordance with the teachings contained hereinabove in both the $x$ and $y$ directions defined by the two dimensional lens array.

In the embodiments of the invention illustrated in FIG. 2 or FIG. 4, in the event that the prism angles $\alpha$ are fixed in order to minimize complexity or cost, interchangeable sets of prisms may be provided in an appropriate mount, each set having prisms disposed at angles $\alpha$ such as to image a preselected point in object space in the image plane. Objects at different distances from the camera may in this manner be imaged in the image plane by replacing one fixed set of prisms by another.

It will be understood by those skilled in the art that the invention is not limited to the specific features described with respect to the above embodiments, and that various changes and modifications may be made therein without departing from the scope of the invention, which is limited only in accordance with the following claims.

I claim:

1. In a camera for forming orthoscopic three-dimensional images on an image plane in image space partially defined with respect to a Z-axis normal to said image plane, including one or more lenses for forming perspectives on said image plane, and a selector screen disposed parallel to the image plane for forming the perspectives from said lenses into a plurality of discrete fields for obtaining a viewable three-dimensional image, the improvement comprising means forming a plurality of discrete optical paths optically aligned with said lenses, each path including an image reversal pseudoscopy correction optical element forming an angle $\alpha$ with respect to the camera axis, and control means for independently varying the convergence of light rays through each optical path such that an object at a predetermined distance from the camera will be imaged in the image plane independently of whether or not such object is in focus, thereby permitting the formation of an image having any desired virtual component independently of the focus of the camera.

2. A camera as defined in claim 1 wherein each of said optical paths consists of an image reversal pseudoscopy correction optical element forming an angle $\alpha$ such that an object at a predetermined distance from the camera will be imaged on the image plane independently of whether or not such object is in focus.

3. A camera as defined in claim 2 wherein said image reversal elements are image reversal prisms.

4. A camera as defined in claim 3 wherein said selector screen is a line or lenticular screen capable of displaying horizontal parallax, said camera having at least three lenses disposed transversely with respect to said line screen, and a prism held in a prism mount pivotably disposed in the optical path of each lens and being pivotable substantially about the center of such lens to control the convergence of light rays passing through such lens.

5. A camera as defined in claim 3 wherein said selector screen is a line or lenticular screen capable of displaying horizontal parallax, said camera having a single lens and a plurality of prisms having exit apertures substantially covering the entire field of view of said lens, each prism being held in a prism mount pivotably disposed in the optical path of such lens and being pivotable about points extending transversely with respect to the elements of said selector screen and disposed close to the plane of such lens for controlling the convergence of light rays passing through said lens.

6. A camera as defined in claim 4 including Z-axis control means for controlling the angles $\alpha$ of all of such prisms together in a predetermined relationship such that an object point at a predetermined distance from the camera is imaged by all lenses at a common point on the image plane in image space.

7. A camera as defined in claim 6, each prism mount having a stud extending therefrom and wherein said Z-axis control means includes a cam member engaged by all said studs and controllable to rotate all of the prism mounts together to continuously vary the angles $\alpha$ while maintaining the relationship $\alpha = \chi$, where is a constant and $\chi$ is the vector distance from the axis of symmetry of the lenses to each respective lens.

8. A camera as defined in claim 5 including Z-axis control means for controlling the angles $\alpha$ of all such prisms together in a predetermined relationship such that an object at a predetermined point in object space is imaged by all lenses at a common point on the image plane in image space.

9. A camera as defined in claim 1 wherein said image reversal elements are image reversal prisms having entrance and exit faces.

10. A camera as defined in claim 9, the axis of each such prism forming an angle $\alpha$ with respect to the camera axis, each said optical path including an optical tilter, the angles $\alpha$ and said tilters being disposed such that an object a a predetermined distance from the camera will be imaged in the image plane independently of whether or not such object is in focus, thereby permitting the formation of an image having any desired virtual component independently of the focus of the camera.

11. A camera as defined in claim 10 wherein said prisms are aligned parallel to the camera axis, each such optical tilter being angularly disposed in conjunction with said prisms to image an object point at a predetermined distance from the camera on the image plane in image space.

12. A camera as defined in claim 9, each such prism having entrance and exit faces forming angles with respect to the base of the prism such that an object at a predetermined distance from the camera will be imaged in the image plane independently of whether or not such object is in focus, thereby permitting the formation of an image having any desired virtual component independently of the focus of the camera.

13. A camera as defined in claim 12 wherein said lenses are constituted by convex lens surfaces formed on at least one of the faces of each said prisms.

14. A camera as defined in claim 1 including a second selector screen mounted back to back with the first mentioned selector screen, a diffusing layer being interposed between said selector screens, such that the depth placement of the image may be directly viewed by looking at said second selector screen.

15. A camera as defined in claim 1 wherein said selector screen is a line or lenticular screen capable of displaying horizontal parallax, said camera having a single lens carried by a moveable lens mount for scanning the lens in a direction transvesely of the selector screen, said optical element being an image reversal prism carried by said mount, and including means for varying the angle $\alpha$ of the prism with respect to the camera axis during such scan such that perspectives taken by the lens of a selected point in object space at all points of its travel during such scan are imaged coincidently at a point in the image plane.

16. A method of forming orthoscopic three dimensional images with a camera having one or more lenses on an image plane in image space partially defined with respect to a Z-axis normal to said image plane comprising the steps of:
 a. forming a plurality of discrete optical paths aligned with a lens, said lens forming perspectives on said image plane,
 b. positioning in each of said optical paths an image reversal pseudoscopy correction optical element at an angle with respect to the lens axis such that an object at a predetermined distance from the camera is imaged in the image plane for a given lens-to-film distance enabling the formation of an image having any desired virtual component and,
 c. forming the perspectives into a plurality of discrete fields for obtaining a viewable three dimensional image.

17. A method as defined in claim 16, wherein the optical elements in the optical paths are moved together such that an object at a predetermined distance from the camera will be imaged in the image plan.

18. A method as defined in claim 16 wherein said image reversal pseudoscopy correction optical elements are prisms.

19. A method as defined in claim 18 including aligning said prisms parallel to the camera axis and disposing an optical tilter in each of said optical paths at an angle such that an object at a predetermined distance from the camera will be imaged in the image plane.

20. A method as defined in claim 16 wherein a line or lenticular selector screen capable of displaying horizontal parallax is employed for forming the perspectives into said discrete fields and including the steps of causing a lens to move in a direction transverse to the lines of the selector screen, forming said optical paths at each position of the lens during movement of said lens by a prism aligned with said lens and imaging the perspectives taken by the lens of a selected point in object space at all points of its travel coincidentaly at a point in the image plane.

21. A method as defined in claim 16 wherein a first selector screen is employed for forming the perspectives into said discrete fields, placing a second selector screen back to back with said first selector screen and directly viewing and adjusting the depth placement of the image upon the second selector screen by interposing a diffusing layer between the first and second selector screens.

22. A method as defined in claim 20 wherein said optical paths include an optical tilter aligned with the prism, said angle remaining zero during such lens movement and including the step of varying the optical tilter during the lens movement such that the perspectives taken by the lens of a selected point in object space at all points of the lens movement are imaged coincidently at a point in the image plane.

23. A method as defined in claim 16 including the steps of disposing a diffusing element in the image plane, choosing the point in object space to be imaged on the image plan, and varying said angles to bring into coincidence the images of this point in the several perspectives seen on the diffusing element.

24. A camera for forming three-dimensional images on an image plane in image space comprising a selector screen disposed parallel to the image plane for forming perspectives into a plurality of discrete fields for obtaining a viewable three-dimensional image, said selector screen having a finite predetermined thickness equal to the desired distance between its surface carrying the lines or lenticules, and the film, and a spring back for yieldably urging the film and selector screen into uniform planar contact with each other whereby images of good optical quality may be formed on film without the necessity for a vacuum back.

25. A camera as defined in claim 24 wherein said spring back is formed of a substantially rigid planar element covering at least the same surface area as such film and provided on its face adjacent such film with a layer of soft yieldable material for assuring planar contact between the film and the selector screen.

26. In an autostereoscopic camera for forming three-dimensional images on an image plane in image space partially defined with respect to a Z-axis normal to said image plane, including one or more lenses for forming perspectives on said image plane, and a selector screen disposed parallel to the image plane for forming the perspectives from said lenses into a plurality of discrete fields for obtaining a viewable three-dimentional image, said camera including means for varying the Z-axis placement of objects in image space, the improvement comprising a second selector screen mounted back to back with the first selector screen, and a diffusing layer interposed between the first and second selector screens such that the depth placement of the image may be directly viewed by looking at said second selector screen.

27. In an autostereoscopic camera for forming three-dimensional images on an image plane in image space partially defined with respect to a Z-axis normal to said image plane, including one or more lenses for forming perspectives on said image plane, and a selector screen disposed parallel to the image plane for forming the perspectives from said lenses into a plurality of discrete fields for obtaining a viewable three-dimensional image, the improvement comprising a second selector screen mounted back to back with the first selector screen, and a diffusing layer interposed between the first and second selector screens such that the depth placement, focus and composition, of the image may be directly viewed by looking at said second selector screen.

* * * * *

UNITED STATES PATENT OFFICE
CERTIFICATE OF CORRECTION

Patent No. 3,769,889                           Dated November 6, 1973

Inventor(s) Robert M. Wechsler

It is certified that error appears in the above-identified patent and that said Letters Patent are hereby corrected as shown below:

Column 2, line 4, change "liner" to --linear--.

Column 3, line 12, change "ease" to --case--

Column 5, line 20, change "$\alpha = \chi$, where = 1°" to

--$\alpha = K\chi$, where $K$ = 1°--.

Claim 7, line 6, change "$\alpha = \chi$, where is a" to --$\alpha = K\chi$, where $K$ is a--.

Claim 15, line 5, change "transvesely" to --transversely--.

Signed and sealed this 25th day of June 1974.

(SEAL)
Attest:

EDWARD M. FLETCHER, JR.                     C. MARSHALL DANN
Attesting Officer                           Commissioner of Patents